US011205025B2

(12) United States Patent
Aboumrad

(10) Patent No.: US 11,205,025 B2
(45) Date of Patent: Dec. 21, 2021

(54) GEARBOX MONITORING

(71) Applicant: Bently Nevada, LLC, Minden, MN (US)

(72) Inventor: Nicholas Ryan Aboumrad, Minden, NV (US)

(73) Assignee: BENTLY NEVADA, LLC, Minden, NV (US)

(*) Notice: Subject to any disclaimer, the term of this patent is extended or adjusted under 35 U.S.C. 154(b) by 563 days.

(21) Appl. No.: 15/971,143

(22) Filed: May 4, 2018

(65) Prior Publication Data
US 2018/0322239 A1 Nov. 8, 2018

Related U.S. Application Data

(60) Provisional application No. 62/501,317, filed on May 4, 2017.

(51) Int. Cl.
G06F 30/17 (2020.01)
G01M 13/021 (2019.01)
(Continued)

(52) U.S. Cl.
CPC ........... G06F 30/17 (2020.01); G01M 13/021 (2013.01); G06F 30/23 (2020.01); G06F 2111/10 (2020.01)

(58) Field of Classification Search
CPC .......... G06F 30/17; G06F 30/00; G06F 30/23; G06F 2111/10; G01M 13/021
(Continued)

(56) References Cited

U.S. PATENT DOCUMENTS 4,320,662 A * 3/1982 Schaub ................. G01M 13/02
702/145
8,452,579 B1 * 5/2013 Perera ..................... G06F 30/23
703/7
(Continued)

FOREIGN PATENT DOCUMENTS

KR 10-2016-0121896 A 10/2016

OTHER PUBLICATIONS

Phi, Dr. Cao Hung, "Mathematical Models and the Noise—Vibration of the Gearboxes", Jan. 2015, Proceedings of the 3rd International Conference on Industrial Application Engineering, The Institute of Industrial Applications Engineers. (Year: 2015).*

(Continued)

Primary Examiner — Cedric Johnson
(74) Attorney, Agent, or Firm — Mintz Levin Cohn Ferris Glovsky and Popeo, PC; Lisa Adams

(57) ABSTRACT

Gear motion of gearboxes can be calculated. A system includes a gear box, a sensor, and at least one data processor. The gear box includes a structure with a plurality of gears. The sensor is operatively coupled to the gear box and is configured to detect an operational parameter associated with a first gear of the gear box. The at least one data processor is configured to: receive, from the sensor, data characterizing the detected operational parameter associated with the gear box; generate a mesh pair matrix for the plurality of gears based on data characterizing the structure of the gear box; determine, from the mesh pair matrix, a calculated value of the operational parameter of the first gear of the plurality of gears; determine, based on the calculated value and the detected value of the operational parameter, an operational metric of the first gear; and provide the operational metric.

18 Claims, 8 Drawing Sheets

(51) Int. Cl.
*G06F 30/23* (2020.01)
*G06F 111/10* (2020.01)

(58) Field of Classification Search
USPC .................................................. 703/7, 6
See application file for complete search history.

(56) References Cited

U.S. PATENT DOCUMENTS

| | | | |
|---|---|---|---|
| 2012/0067138 | A1 | 3/2012 | Klein-Hitpass et al. |
| 2013/0085722 | A1* | 4/2013 | James ............... G06F 30/15 703/1 |
| 2013/0116937 | A1 | 5/2013 | Calhoun et al. |
| 2015/0338201 | A1 | 11/2015 | Wuerfel |
| 2016/0281528 | A1 | 9/2016 | Penda et al. |

OTHER PUBLICATIONS

Bruyere, Jerome et al., "Statistical Tolerance Analysis of Bevel Gear by Tooth Contact Analysis and Monte Carlo Simulation", Dec. 29, 2006, Mechanism and Machine Theory 42, Elsevier Ltd. (Year: 2006).*

Guan, Yuanhong et al., "Comparison of Actuator Designs for Active Vibration Control of a Gear Pair System", Jul. 10, 2002, Smart Structures and Materials 2002: Modeling, Signal Processing and Control, 9th Annual International Symposium on Smart Structures and Materials. (Year: 2002).*

Lim, T.C. et al., "Vibration Transmission through Rolling Element Bearings Part III: Geared Rotor System Studies", 1991, Journal of Sound and Vibration, 151. (Year: 1991).*

Simon, Vilmos, "Influence of Tooth Errors and Misalignments on Tooth Contact in Spiral Bevel Gears", Feb. 21, 2008, Mechanism and Machine Theory 43, Elsevier Ltd. (Year: 2008).*

International Search Report and Written Opinion issued in connection with corresponding PCT Application No. PCT/US2018/031144 dated Aug. 21, 2018.

European Search Report issued in corresponding European Application No. EP 18794575, dated Dec. 17, 2020, 10 pages.

Lim, T.C., et al.: "Vibration Transmission Through Rolling Element Bearings, Part I: Bearing Stiffness Formulation". Journal of Sound and Vibration, Elsevier, Amsterdam, NL, vol. 139, No. 2, Jun. 8, 1990, pp. 179-199.

Lim, T.C., et al.: "Vibration Transmission Through Rolling Element Bearings, Part II: System Studies". Journal of Sound and Vibration, Elsevier, Amsterdam, NL, vol. 139, No. 2, Jun. 8, 1990, pp. 201-225.

Lim, T.C., et al.: "Vibration Transmission Through Rolling Element Bearings, Part III: Geared Rotor System Studies". Journal of Sound and Vibration, Elsevier, Amsterdam, NL, vol. 151, No. 1, Nov. 22, 1991, pp. 31-54.

Simon, et al.: "Influence of Tooth Errors and Misalignments on Tooth Contact in Spiral Bevel Gears", Mechanism and Machine Theory, Pergamon, Amsterdam, NL, vol. 43, No. 10, Oct. 1, 2008, pp. 1253-1267.

* cited by examiner

GEARBOX MONITORING

RELATED APPLICATION

This application claims priority under 35 U.S.C. § 119(e) to U.S. Provisional Patent Application No. 62/501,317 filed May 4, 2017, the entire contents of which is hereby expressly incorporated by reference herein.

BACKGROUND

Gearboxes are devices that can be used to control transfer of mechanical energy from one device to another. A gearbox can include a housing that encloses at least a pair of gears. In general, gears can be wheels that include teeth around their edges and they can be configured to rotate about an axis, such as an axis passing through the center of the gear. As an example, a first gear can be coupled to a power source by a rotatable input shaft and a second gear can be coupled to a mechanical load by a rotatable output shaft. When the teeth of the first gear are engaged with the teeth of the second gear, the pair of gears can convert speed and torque from the power source to the output shaft.

Modern machines (e.g., turbines, compressors, engines, etc.) can include complicated gearboxes that can include several interconnected pairs of gears. Kinematic properties of a gearbox refer to properties of motion (e.g., position, velocity, acceleration, etc.) of respective gears and can be calculated using a gearbox specific formula. As an example, software with hard-coded constants, which can be related to the structural properties of the gearbox, can be used to calculate the kinematic properties of the gearbox.

SUMMARY

Existing approaches to estimating kinematic properties of gearboxes, however, can be problematic. The use of software employing hard-coded, gearbox specific formulae can require development and maintenance of new software each time a new gearbox configuration is designed. The costs associated with such new software can limit flexibility in designing new gearbox configurations. That is, the degree to which new gearbox designs differ from old gearbox designs can be artificially limited by cost, rather than performance considerations. Furthermore, the need to develop new software in support of each new gearbox configuration can delay development and commercialization of new gearbox configurations.

Embodiments of the present disclosure are directed to systems and methods that are configured to employ generic models for determination of kinematic properties of gearboxes. As discussed in detail below, the use of kinematic models having generic applicability to many gearbox configurations can reduce the time and costs required to build, test, and maintain new gearbox configurations.

In an exemplary embodiment, a system is provided and it can include a gear box, a sensor, and at least one data processor. The gear box includes a structure with a plurality of gears. The sensor is operatively coupled to the gear box and is configured to detect an operational parameter associated with a first gear of the gear box. The at least one data processor is configured to receive, from the sensor, data characterizing the detected operational parameter associated with the gear box. The at least one data processor is also configured to generate a mesh pair matrix for the plurality of gears based on data characterizing the structure of the gear box. The mesh pair matrix includes a matrix representation of a system of linear equations representing kinematic relationships between gears of the plurality of gears. The at least one data processor can also be configured to determine, from the mesh pair matrix, a calculated value of the operational parameter of the first gear of the plurality of gears. The at least one data processor can be further configured to determine, based on the calculated value and the detected value of the operational parameter, an operational metric of the first gear; and provide the operational metric of the first gear.

One or more of the following features can be included in any feasible combination. For example, the processor can be further configured to receive data characterizing structure of the gear box. Data characterizing the structure of the gear box can include a first number of teeth of the first gear, a second number of teeth of a second gear of the plurality of gears, and an orientation between the first number of teeth and the second number of teeth. The operational parameter can include an angular velocity of the first gear and the operational metric can include a fault frequency associated with the first gear. The processor can be further configured to calculate a difference between the operational metric and a predetermined threshold. The processor can be further configured to terminate operation of the gear box in response to determining that the operational metric exceeds a predetermined threshold. The processor can be further configured to verify the received data characterizing the structure of the gear box based on a predetermined database associated with the gear box.

In another exemplary embodiment, a method includes: receiving data characterizing structure of a gear box including a plurality of gears; generating a mesh pair matrix for the plurality of gears based on the received data characterizing the structure of the gear box; determining, from the mesh pair matrix, a calculated value of an operational parameter of a first gear of the plurality of gears; and providing the calculated value of the operational parameter.

One or more of the following features can be included in any feasible combination. For example, data characterizing the structure of the gear box can include a first number of teeth of the first gear, a second number of teeth of a second gear of the plurality of gears, and an orientation between the first number of teeth and the second number of teeth. A detected value of the operational parameter can be received from a sensor operatively coupled to the first gear. An operational metric of the first gear can be determined based on the calculated value and the detected value of the operational parameter. The operational parameter can include an angular velocity of the first gear and the operational metric a fault frequency associated with the first gear. A difference between the operational metric and a predetermined threshold can be determined. Operation of the gear box can be terminated in response to determining that the operational metric exceeds a predetermined threshold. The received data characterizing the structure of the gear box can be verified based on a predetermined database associated with the gear box. At least one of the receiving, the generating, the calculating, and the providing can be performed by at least one data processor forming part of at least one computing system.

In another exemplary embodiment, a method can include receiving structural information related to a gearbox. The method can also include generating a gearbox model that can be based on the received structural information of the gearbox. The method can also include calculating, using the gearbox model, an operational parameters of the gearbox.

The method can further include providing one or more of the calculated operational parameters.

Various aspects of the disclosed subject matter may provide one or more of the following capabilities. The systems and methods described in this application provide for a generic model that can be used to determine kinematic properties of a number of multiple gearboxes instead of multiple gearbox specific models to do the same. As a result, a new gearbox specific model may not be needed each time a new gearbox is developed. This can reduce cost that can incur due to the development of a new model each time a new gearbox is developed. Gearbox specific models can also provide several technological improvements. For example, generic gearbox models can allow for efficient memory usage. Because generic gearbox models are configurable to work for any gearbox, they can allow for flexibility to a user who may not have to depend on an operator for reconfiguring the gearbox specific software for a new gearbox.

Non-transitory computer program products (e.g., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

The following drawings are intended show non-limiting examples of the disclosed subject matter. Other embodiments are possible.

DETAILED DESCRIPTION

A gearbox is a device that can be used to transfer mechanical energy from one portion of a machine to another.

As an example, gearboxes can be used in a transmission for adapting mechanical energy input from a power source (e.g., an engine) to another moveable component, such as a rotating shaft. Gearboxes can include multiple gears that move relative to one another to accomplish this energy transfer. It can be desirable to calculate the motion of gears in a gearbox to predict an expected behavior of the gearbox. As an example, by comparing the predicted motion of the gears with measurements of actual gear motion, undesirable motion of gears within the gearbox can be detected. However, existing approaches to predicting gear motion can employ complicated models that are customized to a given gearbox and may not be applicable to other gearboxes. To address this problem, systems and corresponding methods are provided for generically predicting gear motion within a gearbox. The disclosed approaches utilize an understanding that gearboxes are made up of one or more pairs of gears that engage one another. No matter the configuration or type of gears, the principles of how two gears engage one another can remain the same and can be described by a generic equation, also referred to as a characteristic equation. Each time two gears engage one another in a specific configuration, a new equation describing this engagement can be determined from the generic equation. By simultaneously solving a set of equations describing the engagement of each pair of gears within a gearbox, rotational information regarding the gears can be calculated. From this rotational information, other motion properties of the gears (e.g., kinematic properties) and fault properties can be determined, allowing prediction of motion of the gears.

Figure 1:
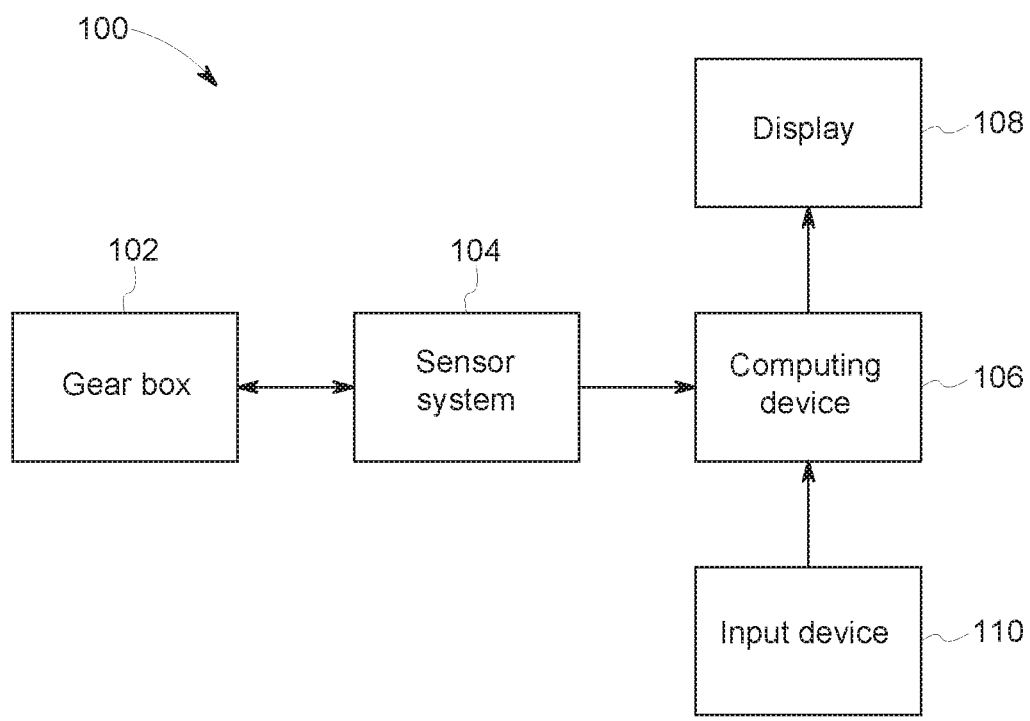
FIG. 1 illustrates a schematic representation of an exemplary embodiment of a gearbox monitoring system.

FIG. 1 is a schematic representation illustrating an exemplary embodiment of a gearbox monitoring system 100 that is configured to monitor a gearbox 102 including gears (not shown). The gearbox monitoring system can include a sensor system 104, a computing device 106, a display 108, and an input device 110. The sensor system 104 can detect one or more movements (e.g., kinematic properties) of the gearbox 102, such as angular velocity of one or more gears in the gearbox 102, and can relay the detected movements to the computing device 106. The computing device 106 can receive the detected information from the sensor system 104. The computing device 106 can receive structural information regarding the gearbox from the input device 110. For example, the structural information can include one or more of a number of teeth, a tooth orientation, and a rotational axis speed of one more gears in the gear box 102.

The computing device 106 can use the structural information to establish numerical relationships between various kinematic properties of the gearbox 102. The numerical relationships can be based on the idea that gearboxes can include one or more gear pairs that are coupled together based on predetermined kinematic relations. The numerical relationships can be used to calculate the kinematic properties of the gearbox 102. The computing device 106 can display the calculated kinematic properties and/or the detected kinematic properties on the display 108. Other embodiments are within the scope of the disclosure.

The numerical relationships of the gearbox 102 can be generated based on identifying the various gears in the gearbox that are, for example, structurally coupled together to form a gear pair. Gear pairs can be identified based on the structural information obtained from the input device 110. For one or more of the identified gear pairs, a kinematic relationship can be identified. For example, kinematic relationship between a first gear and a second gear in a gear pair can be:

$$N_1 G_1 (\omega_1 - t_2) = N_2 G_2 (-\omega_2 + t_1) \quad (1)$$

where $N_1$ and $N_2$ represent the number of teeth in the first and second gear, respectively; $G_1$ and $G_2$ represent teeth orientation of the first and second gear, respectively; $\omega_1$ and $\omega_2$ represent the angular velocity of the first and second gear, respectively; and $t_1$ and $t_2$ represent the rotational axis speed of the first and second gear, respectively. Values of one or more of these parameters can be obtained from the structural information obtained from the input device 110 and/or the measurements acquired by the sensor system 104.

A gear can engage multiple gears and, therefore, be a part of two or more gear pairs. This configuration can result in multiple kinetic relationships (e.g., as shown in Equation 1 above). For example, N (a natural number) kinetic relationships can be established for N gear pairs in a gearbox. The N kinetic relationships can be solved to determine angular velocity of various gears in gear pairs.

The kinematic relationship of Equation 1 can be used with gears of any type and configuration. Examples can include spur gears, helical gears, skew gears, double helical gears, bevel gears, spiral gears, hypoid gears, crown gears, worm gears, non-circular gears, cage gears, cycloidal gears, magnetic gears, rack and pinion gears, epicyclic gearing, sun and planet gears, harmonic gears, and the like.

Figure 2:
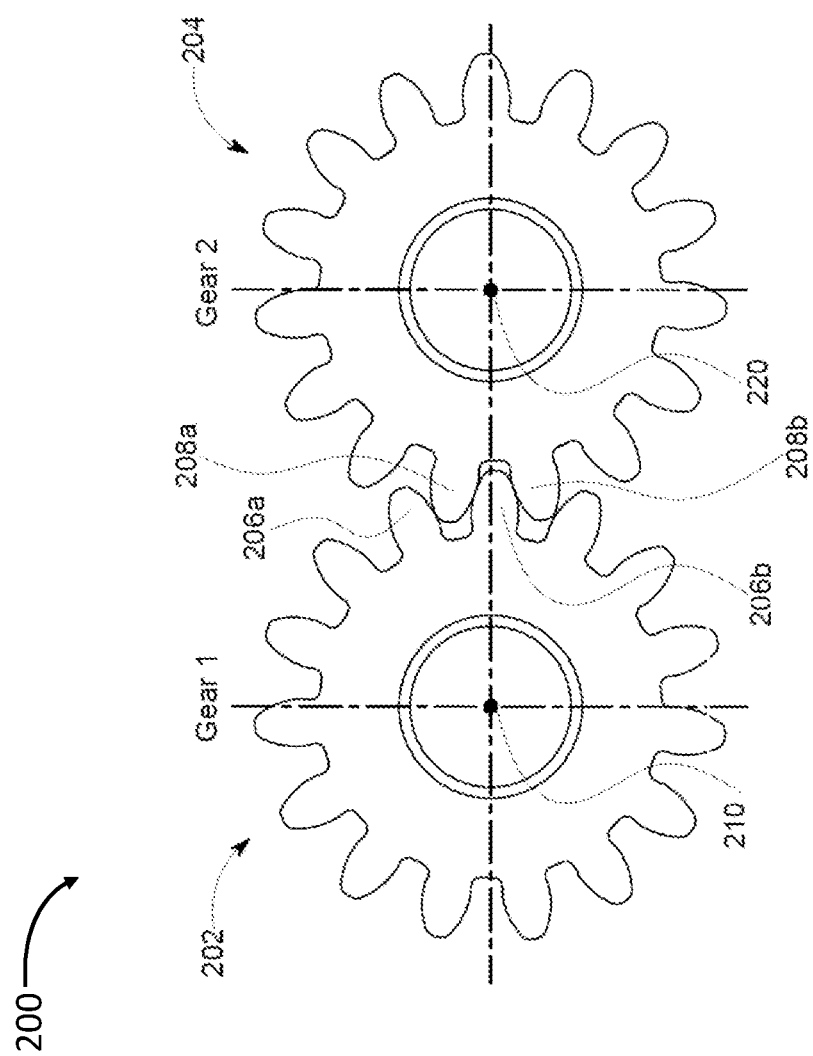
FIG. 2 is a side view of an exemplary embodiment of a gear pair.

FIG. 2 illustrates an exemplary embodiment of a gear pair 200 which can include gears 202 and 204. The gears 202 and 204 can include teeth (e.g., teeth 206a and 206b in gear 202, and teeth 208a and 208b in gear 204). The teeth 206a, 206b, 208a, and 208b can be oriented outwards from gears 202 and 204, respectively. Gears 202 and 204 can rotate about the axes 210 and 220, respectively. As the gears 202 and 204 rotate about the axes 210 and 220, teeth of the gears 202 and 204 can couple together. For example, tooth (one of teeth 206b) of gear 202 can slide between the teeth 208a and 208b of gear 204. In addition to the rotation of the gears 202 and 204, axis 210 and axis 212 can also rotate.

As gear 202 rotates, it can drive gear 204 to rotate. The converse is also true, where rotation of gear 204 can drive gear 202 to rotate. The angular velocity of rotation of the gears 202 and 204 can be related, for example, based on Equation 1. To use Equation 1, $N_1$ and $N_2$ can be replaced by the values for the number of teeth for 202 and 204, respectively. $G_1$ and $G_2$ can also be replaced by the orientation of teeth for 202 and 204, respectively (e.g., "1" for outward orientation and "−1" for an inward orientation). $t_1$ and $t_2$ can be further replaced by the speed of rotation of axes for 210 and 220, respectively. In this manner, a numerical relationship can be established between $\omega_1$ and $\omega_2$ which can represent the angular velocity of gears 202 and 204, respectively. If the value of either $\omega_1$ or $\omega_2$ is known, the computing device 106 can calculate the other value.

Figure 3:
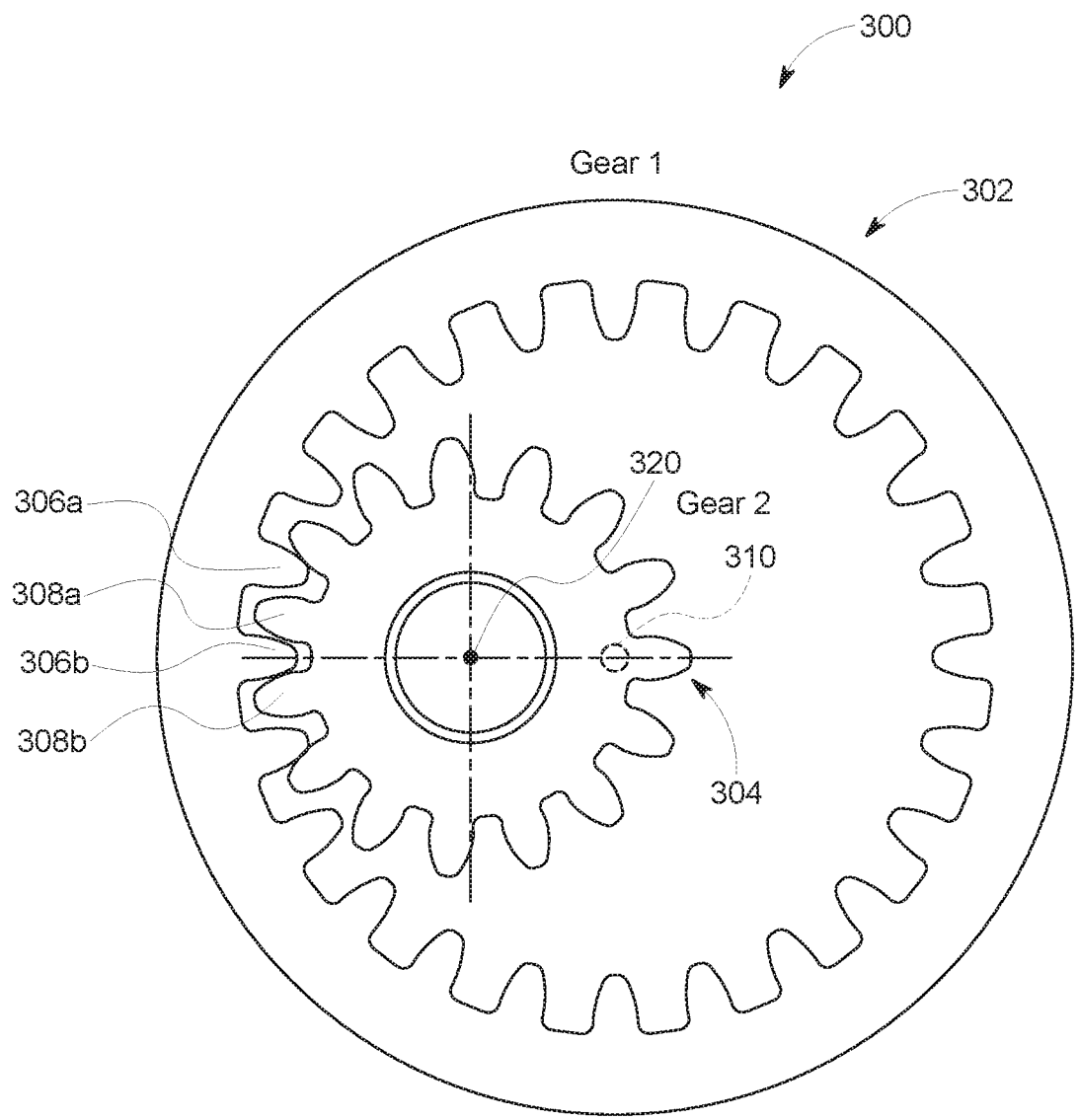
FIG. 3 is another side view of an exemplary embodiment of a gear pair.

FIG. 3 illustrates another exemplary embodiment of a gear pair 300 which can include gears 302 and 304. The gears 302 and 304 include teeth (e.g., teeth 306a and 306b in gear 302, and teeth 308a and 308b in gear 304). The gears 302 and 304 can rotate about the axes 310 and 320, respectively. As the gears 302 and 304 rotate about the axes, teeth of the gears 302 and 304 can couple together. For example, tooth (e.g., one of teeth 306b) of gear 302 can slide between the teeth 308a and 308b of gear 304. One or both of the axes 310 and 312 can also rotate.

As shown, the gear 302 is an internal gear and the gear 304 is an external gear. The teeth 306a of the gear 302 are oriented inwards, and the teeth 306b of the gear 304 are oriented outwards. While establishing the kinematic relation between the gear 302 and the gear 304, using on in Equation 1, the variable representing the outward orientation of the gear 302 (e.g., $G_1$) can have the value −1, while the variable representing the inward orientation of the gear 304 (e.g., $G_2$) can have the value +1. The relation between the angular velocity ($\omega_1$) of gear 302 and angular velocity ($\omega_2$) of gear 304 can be established by replacing $N_1$ and $N_2$ by the values for the number of teeth for 302 and 304, respectively; $G_1$ and $G_2$ by −1 and +1, respectively; and $t_1$ and $t_2$ by the speed of rotation of axes for 310 and 320, respectively.

Figure 4:
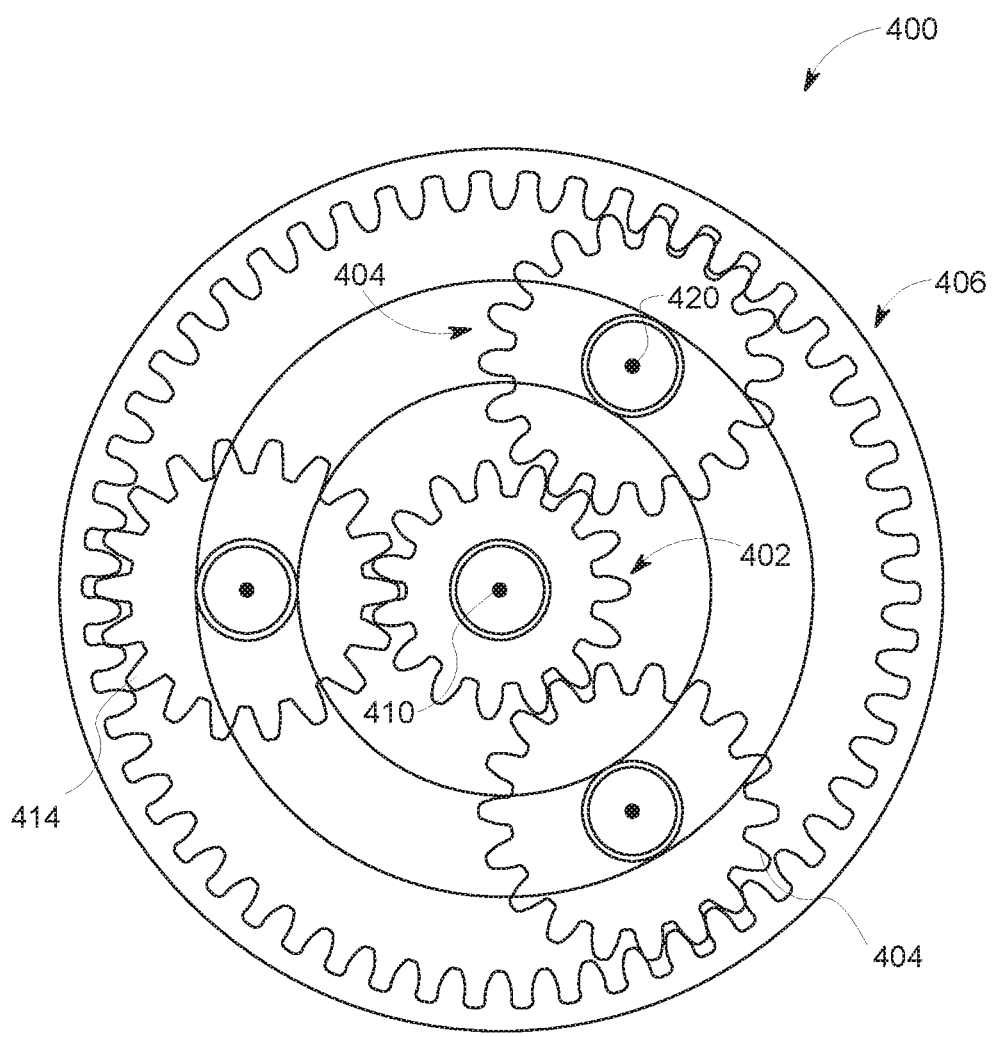
FIG. 4 is a side view of another an exemplary embodiment of a gearbox that can include several gear pairs.

FIG. 4 illustrates an exemplary embodiment of a gearbox 400 that can include several gear pairs in a sun and planet configuration. The gearbox 400 can include a first gear 402 (e.g., a sun gear) that can have multiple teeth (e.g., $N_{sun}$) that are oriented outwards ($G_{Sun}=1$), and can rotate about an axis 410 with an angular velocity $\omega_{sun}$ and an angular velocity $t_{sun}$. The gearbox 400 can include one or more second gears 404 and 414 (e.g., a planet gear) that can have multiple teeth (e.g., $N_{planet}$) that are oriented outwards ($G_{planet}=1$), and can rotate about an axis 420 with an angular velocity $\omega_{planet}$. The axis 420 can rotate, for example, at an angular velocity $t_{planet}$. The gearbox 400 can also include a third gear 406 (e.g., a ring or external gear) that can have multiple teeth (e.g., $N_{ring}$) that are oriented inwards ($G_{ring}=-1$) and can rotate about axis 410 with an angular velocity $\omega_{ring}$ and an angular velocity $t_{ring}$. In certain embodiments, the gear 406 and axis 410 can be fixed (e.g., $\omega_{ring}=0$, $t_{ring}=0$).

The structural information of the gearbox 400 can be received by the computing device 106 from one or more sources. Examples can include input by a user through input device 110, retrieval from a storage device, and combinations thereof. The structural information can include, for example, values for $N_{sun}$, $G_{sun}$, $t_{sun}$, $N_{planet}$, $G_{planet}$, $t_{planet}$, $N_{ring}$, $G_{ring}$, $t_{ring}$, etc. These values can be based on the design specification of the gearbox 400. A kinematic relationship between two gear pairs, 402 and 404, and 404 and 406 can be established based on Equation 1. For example, the following kinematic relationship can be established:

$$N_{sun}G_{sun}(\omega_{sun}-t_{planet})=N_{planet}G_{planet}(-\omega_{planet}+t_{sun}) \quad (2)$$

$$N_{planet}G_{planet}(\omega_{planet}-t_{ring})=N_{ring}G_{ring}(-\omega_{ring}+t_{planet}) \quad (3)$$

Based on Equations (2) and (3), computing device 106 can calculate angular velocities $\omega_{sun}$ and $\omega_{planet}$ of gears 402 and 404.

As described before, any gearbox can be described as a system of one or more gear pairs. A gearbox model that includes kinematic relationship (e.g., as described in Equations (1), (2), (3), etc.) for one or more gear pairs can be established. A computing device (e.g., computing device 106) can solve the kinematic relationships and calculate various kinematic properties of the gearbox. Therefore, the method of first establishing kinetic relationships between various gear pairs, and then using the kinetic relationships to calculate kinematic properties is not gearbox specific.

Figure 5:
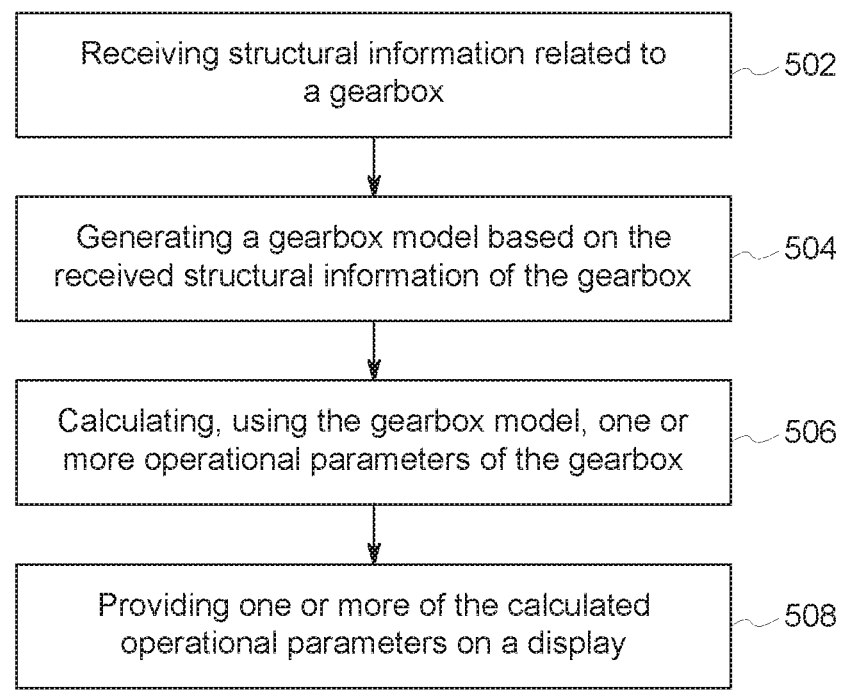
FIG. 5 is a flow chart of an exemplary method for generically calculating kinematic properties of a gearbox.

FIG. 5 illustrates an exemplary method for generically calculating kinematic properties of a gearbox (e.g., 102) using one or more computing devices (e.g., 106). At 502, the computing device 106 can receive structural information related to the gearbox. The computing device 106 can receive this information from a user an input device (e.g., a keyboard, a memory device, etc.), a local or remote data storage device in communication with the computing device directly or through a communication network, etc. The input information can include information related to the structure of the gearbox 102. For example, coupling information of gear pairs, number of teeth in or more gears in the gearbox 102, orientation of teeth in one or more gears in the gearbox 102, angular velocity of the axes of one or more gears in the gearbox 102, etc.

At 504, the computing device 106 can generate a gearbox model based on the received structural information of the gearbox 102. For example, a kinematic relationship (e.g., as shown in Equations (1)-(3)) can be established for one or more gear pairs. The kinematic relationships can include the information provided by the user (e.g., information provided at 502), information from a database maintained by a local or remote data storage device (e.g., an online database for gearboxes), etc. For example, as described below at 604 of FIG. 6, the computing device 106 can generate a mesh pair matrix, and populate the mesh pair matrix with the received structural information.

At 506, the computing device 106 can calculate, using the gearbox model, one or more operational parameters of the gearbox 102. This can be done by solving one or more the various kinematic relationships of the gearbox model generated at 504 (or as described at 604). For example, the kinematic relationships are linear equations can constitute a system of linear equations. A system of linear equations can be described as a product of a matrix and a vector. The matrix can include the known values of the linear equations. For example, the known values can include one or more structural parameters received by the computing device 106 at 502, or a value derived from the one or more parameters (e.g., $N_1 G_1$, $N_2 G_2$). The vector can include the unknown variables (e.g., $\omega_1$, $\omega_2$, etc.). The system of linear equations can be solved by a numerical solver software (e.g., numerical solvers in MATLAB, EXCEL, etc.) in the computing device. Numerical solver software can use efficient linear algebra techniques such as matrix inversion to calculate one or more operating parameters of the gearbox 102.

At 508, the computing device 106 can provide one or more of the calculated operational parameters. The providing can include displaying, transmitting, processing, or storing the calculated operational parameters.

Figure 6:
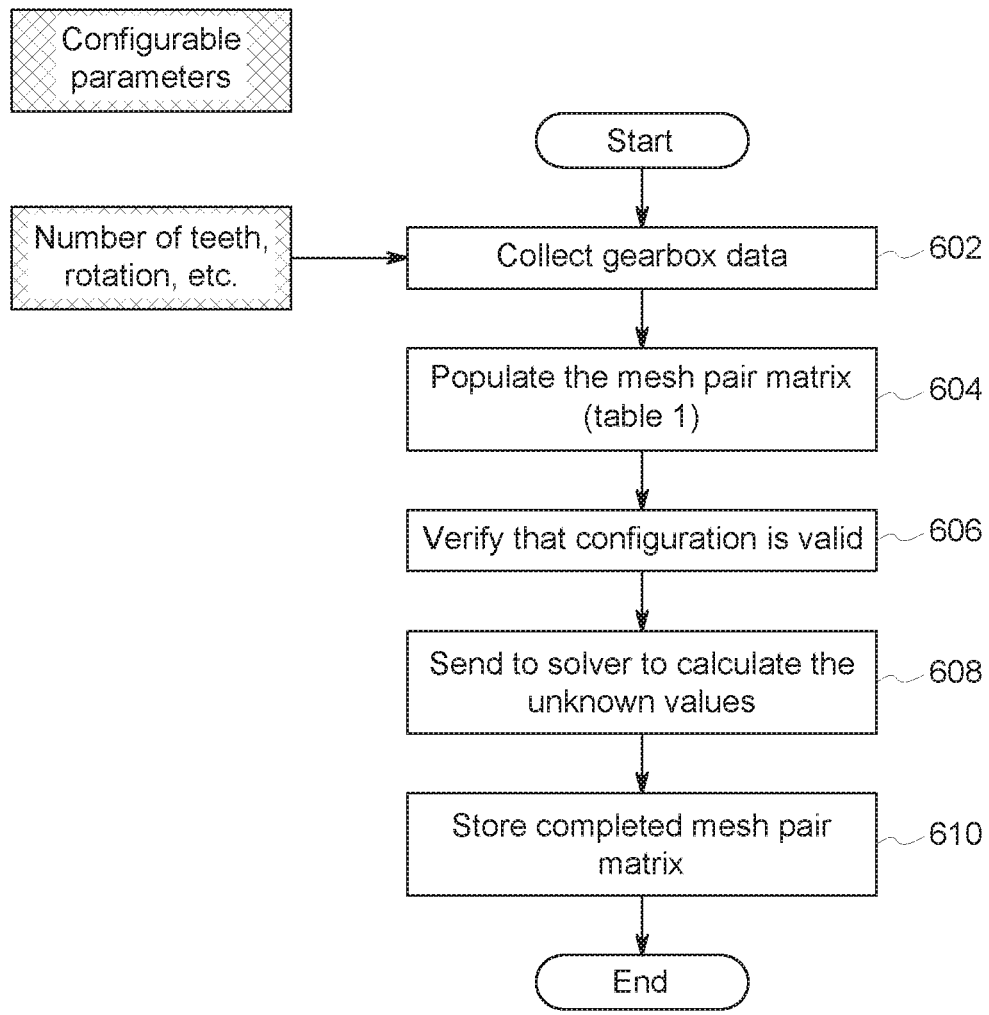
FIG. 6 illustrates an exemplary method for generically calculating kinematic properties of a gearbox using a computing device.

FIG. 6 illustrates an exemplary method for generically calculating kinematic properties of a gearbox (e.g., 102) using a computing device (e.g., 106). The calculated kinematic properties can include the motion of gears in the gearbox 102. The calculated values can be used to predict an expected behavior of the gearbox 102.

At 602, the computing device 106 can receive structural information related to the gearbox 102. The computing device 106 can receive this information from an input device (e.g., a keyboard, a memory device, etc.), a local or remote data storage device (e.g., web source), etc. The input information can include information related to the structure of the gearbox 102. For example, coupling information of gear pairs, number of teeth in or more gears in the gearbox 102, orientation of teeth in one or more gears in the gearbox 102, angular velocity of the axes of one or more gears in the gearbox 102, etc.

At 604, the computing device 106 can generate a mesh pair matrix by populating the matrix, for example, based on the inputs received at 602. The matrix is representative of the known information (e.g., structural information such as number of teeth on one or more gears, orientation and/or coupling of one or more gears, etc.). For example, a row or a column of the mesh pair matrix can include structural information of a given gear. Additionally or alternately, a column or a row of the matrix can include information related to a given variable (e.g., $N_1$, $N_2$, $G_1$, $G_2$, $t_1$, $t_2$, $\omega_1$, $\omega_2$, etc.) in Equation (1).

At 606, the computing device 106 can verify that the configuration of the gearbox 102 is correct. For example, the computing device 106 can perform verification by comparing the structural information obtained at 602 and/or elements of the mesh pair matrix generated at 604 with known acceptable ranges of values. If the structural information or mesh pair matrix entries exceed the known acceptable ranges of values, the configuration may be invalid.

At 608, the computing device 106 can numerically solve a system of equations (e.g., represented by the mesh pair matrix) to calculate unknown values (e.g., angular velocity of one or more gears in the gearbox). This can include inverting the mesh pair matrix. For example, the mesh pair matrix represents kinematic relationships that are linear equations. The mesh pair matrix can constitute a system of linear equations that can be solved by numerical solver software (e.g., numerical solvers in MATLAB, EXCEL, etc.) in the computing device. Numerical solver software can use efficient linear algebra techniques such as matrix inversion to calculate one or more operating parameters of the gearbox.

At 610 the computing device 106 can store the mesh pair matrix generated at step 602. This can include taking the previously unknown values that are determined at 608 and inserting them into the mesh pair matrix.

Figure 7:
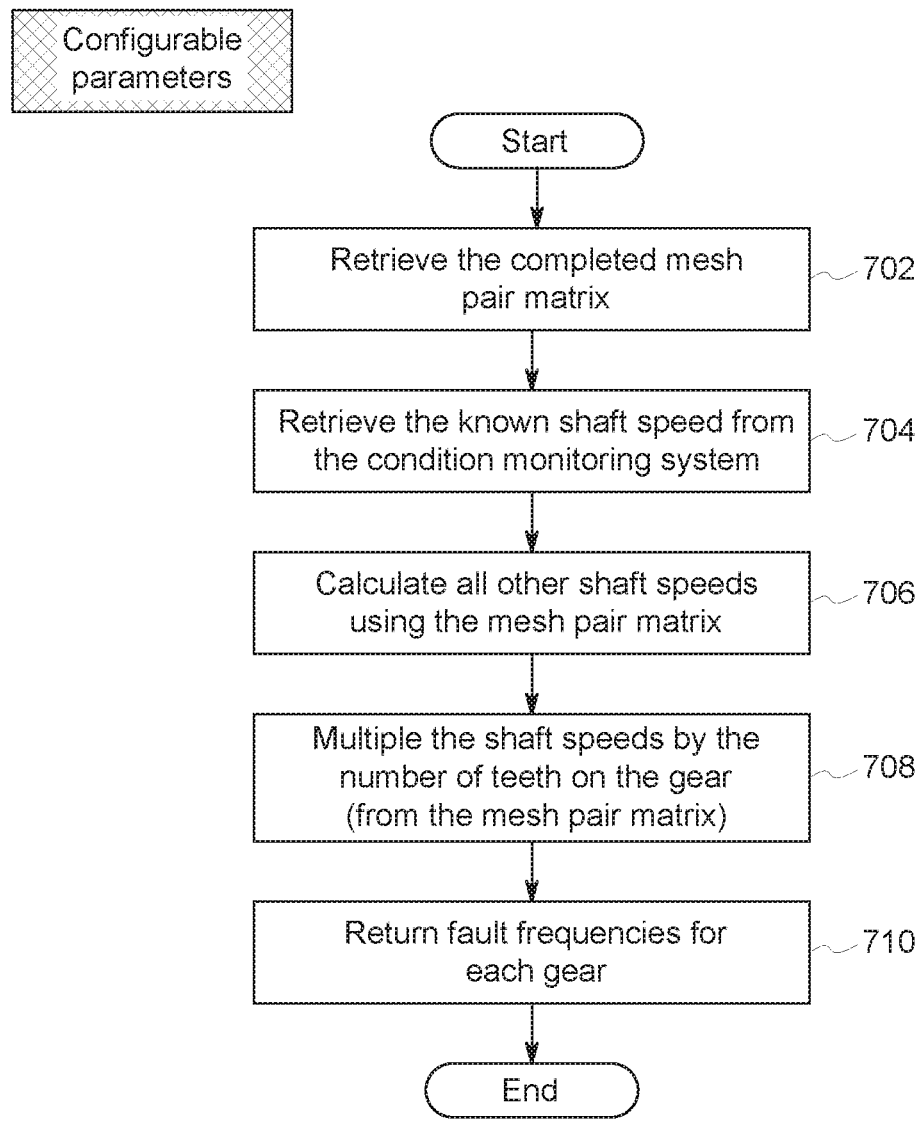
FIG. 7 illustrates an exemplary method for determining fault frequencies of gears in a gearbox.

FIG. 7 illustrates an exemplary method for determining fault frequencies of gears in a gearbox (e.g., 102). The exemplary method of FIG. 7 can utilize the mesh pair matrix completed as described with respect to FIG. 6 in order to determine or identify fault frequencies for each gear contained in the gearbox 102.

At 702, a computing device (e.g., 106) can retrieve completed mesh pair matrix of the gearbox 102 (e.g., mesh pair matrix stored at 610). The mesh pair matrix of the gearbox 102 can be retrieved from memory, received from another computing device (e.g., a local or remote data storage device), and the like.

At 704 the computing device 106 can also receive the shaft speed (e.g., angular velocity) of one or more gears in the gearbox 102 from a condition monitoring system (e.g., accelerometers configured to detect the motion of gears). The condition monitoring system can include a system of sensors (e.g., accelerometers) that can be configured to detect the motion (e.g., angular velocity) of one or more gears in the gearbox 102.

At 706, the computing device 106 can calculate the shaft speed of various gears on the gearbox 102. Calculation of the shaft speed can be performed, for example, as described in FIGS. 5 and 6. Calculation of the shaft speed can be performed using the mesh pair matrix retrieved at 702.

At 708, the computing device 106 can multiply the shaft speed of one or more gears in the gearbox 102 with the number of teeth on the respective gears. Information related to the teeth of the respective gears can be obtained from the retrieved mesh pair matrix retrieved at 702. The computing device 106 can also compare the product of the shaft speed and the number of teeth with the product of shaft speed retrieved at 704 with the number of teeth. Based on this comparison, the computing device 106 can determine fault frequencies associated with one or more gears in the gearbox. For example, the computing device 106 can calculate a difference between the speed calculated value at step 706 and the speed value received at step 704. In some implementation, the computing device can notify an authorized user when the difference exceeds a threshold value. In other implementations, the processor can terminate the operation of the gear box in response to determining that the difference exceeds a predetermined threshold value.

At 710, the computing device 106 can return or provide the determined fault frequencies. The providing step can including transmitting (e.g., to another computing system), displaying (e.g., on a graphical interface display space or display), storing (e.g., within memory, hard drive, database, or the like) or processing. In some implementation, the providing can include causing notification of an authorized user of the fault frequencies, for example, when the fault frequencies exceed a threshold value. In some implementations, providing the determined fault frequencies can include processing the fault frequencies to determine that the fault frequencies exceed a threshold value and causing termination of the operation of the gear box in response to the determining.

Figure 8:
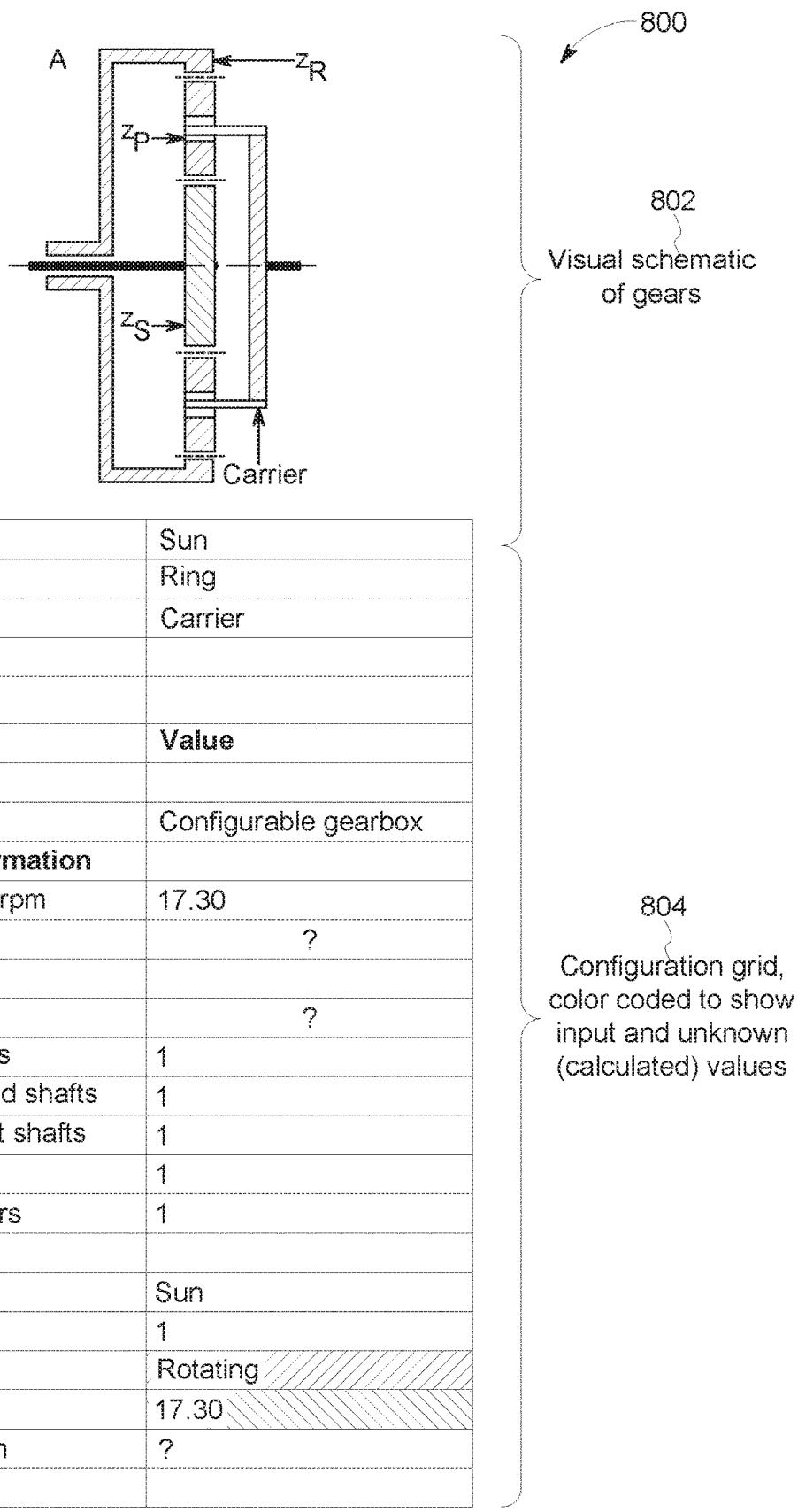
FIG. 8 illustrates an implementation of an interface of a gearbox monitoring system.

FIG. 8 illustrates an example implementation of an interface 800 of a gearbox monitoring system (e.g., a gearbox monitoring system 100). The interface 800 can include visual schematics 802 of one or more gears in the gearbox (e.g., 102). For example, the visual schematics 802 can include the orientation of the gear pairs 300, as described in FIG. 3, or the orientation of sun gear 402, planet gears 404, and ring gear 406 of the gearbox 400 of FIG. 4. The interface 800 can also include a data section 804 that can include structural information associated with the gearbox (e.g., values of the mesh pair matrix described in FIG. 6, FIG. 7, etc.). The data section 804 can allow the user to add or edit the values of one or more structural information. Data section 804 can display results of the computation performed by the computational device (e.g., unknown values calculated at 608, fault frequencies determined at 710, etc.).

Other embodiments are within the scope and spirit of the disclosed subject matter. For example, gearboxes are commonly used in various machines (e.g., turbines, aircraft engines, automobiles, motors, electric generators, etc.). The disclosed subject matter can improve the performance of machines with gearboxes. As an example, the gearbox in a wind turbine can transfer energy from the blades of the turbine which can be slowly moving to a generator that can include a fast moving coil loop. Structural information of coupled gears in the wind turbine gearbox can determine the ratio of angular speed between the blade of the turbine and the coil loop of the generator. Gearbox monitoring system (e.g., gearbox monitoring system 100) can determine the ratio of the angular speed based on the structural information.

Exemplary technical effects of the methods, systems, and devices described herein include, by way of non-limiting example, implementation of a generic model for predicting kinematic properties of gearboxes. The generic model can be configured to describe any gearbox, reducing the time and cost of developing and sustaining new types of gearboxes. The generic model can further provide gearbox operators with the flexibility to pursue any gearbox design, as the generic model is capable of predicting kinematic properties regardless of configuration and complexity.

Certain exemplary embodiments have be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A system comprising:
   a gear box comprising a structure with a plurality of gears;
   a sensor operatively coupled to the gear box and configured to detect an operational parameter associated with a first gear of the gear box; and
   at least one data processor configured to:
      receive, from the sensor, data characterizing the detected operational parameter associated with the gear box;
      receive data characterizing a structure of the gear box, the received data indicative of a first number of teeth of the first gear and orientation of the first number of teeth;
      generate a mesh pair matrix for the plurality of gears based on data characterizing the structure of the gear box, the mesh pair matrix including a matrix representation of a system of linear equations representing kinematic relationships between gears of the plurality of gears, wherein the system of linear equations includes the first number of teeth and orientation of the first number of teeth;
      determine, from the mesh pair matrix, a calculated value of the operational parameter of the first gear of the plurality of gears;
      determine, based on the calculated value and the detected value of the operational parameter, an operational metric of the first gear; and
      provide the operational metric of the first gear.

2. The system of claim 1, wherein data characterizing the structure of the gear box includes a second number of teeth of a second gear of the plurality of gears, and an orientation between the first number of teeth and the second number of teeth.

3. The system of claim 2, wherein the operational parameter includes an angular velocity of the first gear and the operational metric includes a fault frequency associated with the first gear.

4. The system of claim 3, wherein the processor is further configured to calculate a difference between the operational metric and a predetermined threshold.

5. The system of claim 4, wherein the processor is further configured to terminate operation of the gear box in response to determining that the operational metric exceeds a predetermined threshold.

6. The system of claim 1, wherein the processor is further configured to verify the received data characterizing the structure of the gear box based on a predetermined database associated with the gear box.

7. A method comprising:
   receiving data characterizing structure of a gear box including a plurality of gears, the received data indicative of a first number of teeth of a first gear of the plurality of gears and orientation of the first number of teeth;
   receiving data characterizing an operational parameter associated with the first gear in the gear box, the operational parameter detected by a sensor operatively coupled to the gear box;
   generating a mesh pair matrix for the plurality of gears based on the received data characterizing the structure of the gear box, the mesh pair matrix including a matrix representation of a system of linear equations representing kinematic relationships between gears of the plurality of gears, wherein the system of linear equations includes the first number of teeth and orientation of the first number of teeth;

determining, from the mesh pair matrix, a calculated value of an operational parameter of a first gear of the plurality of gears;

determining, based on the calculated value and the operational parameter detected by the sensor, an operational metric of the first gear; and providing the calculated value of the operational parameter.

8. The method of claim 7, wherein data characterizing the structure of the gear box includes a second number of teeth of a second gear of the plurality of gears, and an orientation between the first number of teeth and the second number of teeth.

9. The method of claim 8, wherein the operational parameter is an angular velocity of the first gear and the operational metric a fault frequency associated with the first gear.

10. The method of claim 9, further comprising:
calculating a difference between the operational metric and a predetermined threshold.

11. The method of claim 10, further comprising:
terminating operation of the gear box in response to determining that the operational metric exceeds a predetermined threshold.

12. The method of claim 7, further comprising verifying the received data characterizing the structure of the gear box based on a predetermined database associated with the gear box.

13. The method of claim 7, wherein at least one of the receiving, the generating, the calculating, and the providing is performed by at least one data processor forming part of at least one computing system.

14. A non-transitory machine-readable medium storing instructions that, when executed by at least one data processor, cause the at least one data processor to perform operations comprising:

receiving data characterizing structure of a gear box including a plurality of gears, the received data indicative of a first number of teeth of a first gear of the plurality of gears and orientation of the first number of teeth;

receiving data characterizing an operational parameter associated with the first gear in the gear box, the operational parameter detected by a sensor operatively coupled to the gear box;

generating a mesh pair matrix for the plurality of gears based on the received data characterizing the structure of the gear box, the mesh pair matrix including a matrix representation of a system of linear equations representing kinematic relationships between gears of the plurality of gears, wherein the system of linear equations includes the first number of teeth and orientation of the first number of teeth;

determining, from the mesh pair matrix, a calculated value of an operational parameter of a first gear of the plurality of gears;

determining, based on the calculated value and the operational parameter detected by the sensor, an operational metric of the first gear; and providing the calculated value of the operational parameter.

15. The non-transitory machine-readable medium of claim 14, wherein data characterizing the structure of the gear box includes a second number of teeth of a second gear of the plurality of gears, and an orientation between the first number of teeth and the second number of teeth.

16. The non-transitory machine-readable medium of claim 15, the operations further comprising:

receiving a detected value of the operational parameter from a sensor operatively coupled to the first gear; and determining, based on the calculated value and the detected value of the operational parameter, an operational metric of the first gear.

17. The non-transitory machine-readable medium of claim 16, wherein the operational parameter is an angular velocity of the first gear and the operational metric a fault frequency associated with the first gear.

18. The non-transitory machine-readable medium of claim 17, the operations further comprising:

calculating a difference between the operational metric and a predetermined threshold; and terminating operation of the gear box in response to determining that the operational metric exceeds a predetermined threshold.

* * * * *